Jan. 6, 1959  C. W. HANSEN  2,867,314
AUGER CONVEYOR

Filed June 18, 1957  2 Sheets-Sheet 1

Charles W. Hansen
INVENTOR.

Jan. 6, 1959 — C. W. HANSEN — 2,867,314
AUGER CONVEYOR
Filed June 18, 1957 — 2 Sheets-Sheet 2

Charles W. Hansen
INVENTOR.

BY
Attorneys

United States Patent Office 2,867,314
Patented Jan. 6, 1959

2,867,314

AUGER CONVEYOR

Charles W. Hansen, Ellsworth, Minn.

Application June 18, 1957, Serial No. 666,358

6 Claims. (Cl. 198—64)

This invention relates in general to new and useful improvements in conveyor systems, and more specifically to an auger type conveyor for transporting and delivering material such as forage.

The primary object of this invention is to provide an improved conveyor which may be used in delivering forage and other material from a hopper along the length of the conveyor, with the material being distributed evenly from the conveyor throughout the length thereof.

Another object of this invention is to provide an improved conveyor for materials, the conveyor being provided with hoppers at opposite ends thereof, and being reversible whereby materials may be selectively delivered by the conveyor from either of the two hoppers.

Another object of this invention is to provide an improved conveyor assembly, the conveyor assembly including a hopper fixedly mounted at one end of an elongated delivery tube, the delivery tube having a rotatable connection with the hopper and there being an auger which extends through the delivery tube and into the hopper for delivering materials from the hopper into the delivery tube, the delivery tube being provided with a plurality of discharge openings throughout the length thereof, the lowest walls or edges of the discharge openings progressively decreasing in height whereby flow from the delivery tube throughout the length thereof is even.

Another object of this invention is to provide an improved conveyor system which includes an elongated delivery tube having delivery openings therein, the delivery tube being rotatable about its longitudinal axis whereby the delivery openings may be disposed at the bottom thereof to prevent entry of rain, snow, etc. which would be detrimental to the conveyor when not in use.

A further object of this invention is to provide an improved conveyor system for delivering forage to feed bunks, the conveyor system including an elongated delivery tube having hoppers at opposite ends thereof, a conveyor extending through the delivery tube into the hoppers, there being provided reversible drive means for selectively driving the auger in opposite directions, the delivery tube being provided with openings therein, the delivery tube being selectively rotatable with respect to the hoppers whereby the flow of material from the delivery tube is controlled.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 3 is an enlarged fragmentary longitudinal sectional view taken substantially upon the plane indicated by the section line 3—3 of Figure 2 and shows the relationship between the delivery tube, a hopper, and the auger extending through the delivery tube and into the hopper;

Figure 4 is an enlarged fragmentary sectional view taken substantially upon the plane of the section line 4—4 of Figure 3 and shows the details of an adjustable baffle mounted on an end wall of the hopper;

Figure 8 is a schematic side elevational view of the conveyor shown in the arrangement of hoppers at opposite ends of the delivery tube.

Figure 1:
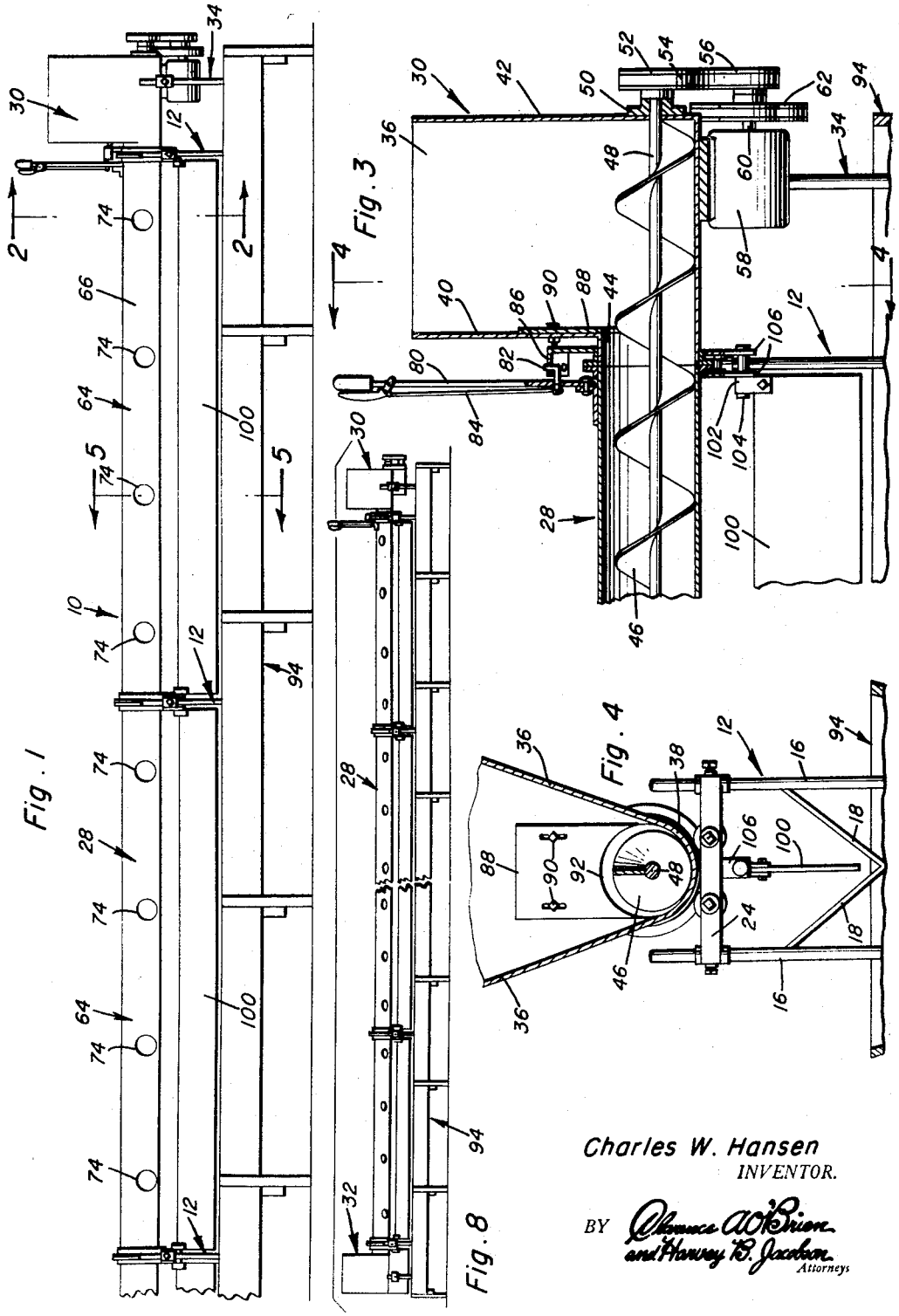
Figure 1 is a fragmentary side elevational view of a feed bunk having mounted therein and extending thereabove the conveyor which is the subject of this invention.
Figure 2:
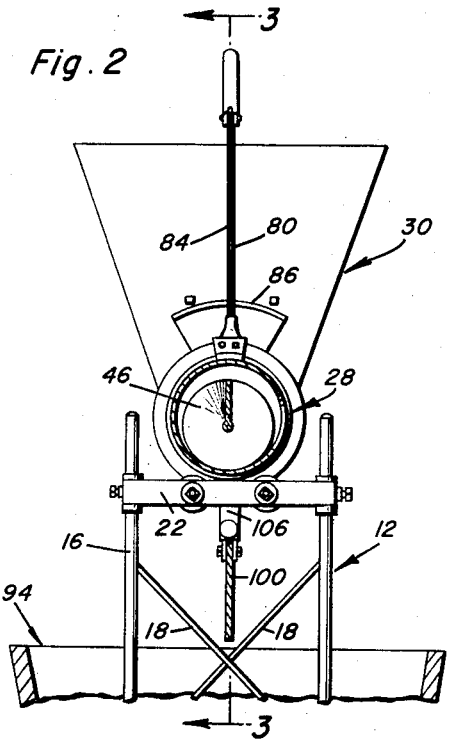
Figure 2 is an enlarged fragmentary transverse sectional view taken substantially on the plane indicated by the section line 2—2 of Figure 1 and shows generally the details of mounting the delivery tube including means for rotating the delivery tube with respect to one of the hoppers.

Referring now to the drawings in detail, it will be seen that there is illustrated the conveyor which is the subject of this invention, the conveyor being referred to in general by the reference numeral 10. The conveyor 10 includes a supporting frame which is in the form of a plurality of individual frame units 12 spaced longitudinally of the length of the conveyor.

Figure 5:
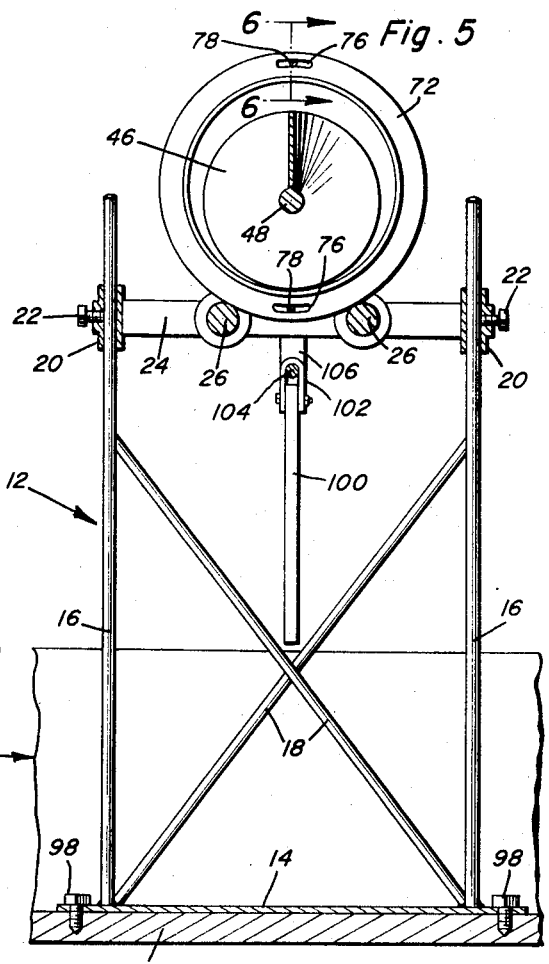
Figure 5 is an enlarged fragmentary sectional view taken substantially upon the plane indicated by the section line 5—5 of Figure 1 and shows the details of the support frame and the manner in which the delivery tube is carried thereby.

As is best shown in Figure 5, each frame unit 12 includes a base member 14 which has extending upwardly therefrom transversely spaced standards 16. The standards 16 have the lower portions thereof braced by suitable X-bracing members 18. Supported by upper portions of the standards 16 are sleeves 20 which are retained in adjusted positions on the standards 16 by means of set screws 22. Extending between the sleeves 20 on opposite sides thereof are spaced parallel bars 24. Disposed between the bars 24 in transversely spaced relation are flanged rollers 26.

As is best shown in Figure 8, the conveyor 10 also includes an elongated delivery tube 28 which has its opposite ends coupled to hoppers 30 and 32 which are identical. The hoppers 30 and 32 are supported by frame units 34 which are similar to the frame units 12.

Referring now to Figures 3 and 4 in particular, it will be seen that each of the hoppers 30 and 32 (only the hopper 30 being specifically illustrated) includes a pair of downwardly converging side walls 36 which are connected together by a rounded bottom wall 38. The opposite ends of the hoppers 30 and 32 are defined by end walls 40 and 42. The end wall 40 carries a tubular extension 44 extending away from the end wall 42. Connected to the tubular extension 44 is the delivery tube 10.

Extending through the delivery tube 10 and into the hoppers 30 and 32 is an elongated auger 46. The auger 46 is disposed in the bottom part of the delivery tube 10 as well as in the bottom parts of the hoppers 30 and 32. The auger 46 includes a shaft 48 which extends through a bearing 50 carried by the end wall 42 of the hopper 30. A drive pulley 52 is mounted on the shaft 48 and is driven by means of a drive belt 54 from a drive pulley 56. Mounted beneath the hopper 30 is an electric motor 58 of the reversible type. The electric motor 58 includes an armature shaft 60 on which there is mounted an adjustable ratio reduction drive 62. The reduction drive 62 is in turn coupled to the drive pulley 56.

Figure 6:
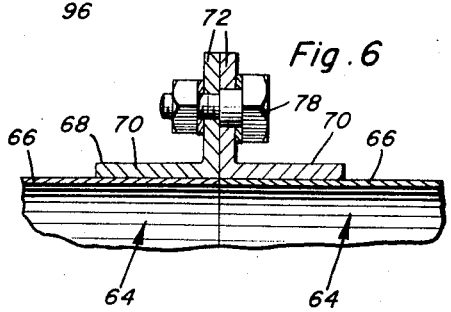
Figure 6 is an enlarged fragmentary sectional view taken substantially upon the plane indicated by the section line 6—6 of Figure 5 and shows the details of an adjustable connection between adjacent sections of the delivery tube.

Referring now to Figure 1, it will be seen that the delivery tube 28 is formed of a plurality of similar sections 64. Each of the sections 64 includes an elongated tube 66 which is provided at opposite ends thereof with annular mounting collars 68 which are angular in cross sections. As is best shown in Figure 6, each mounting collar 68 includes a first flange 70 which extends about and is secured to the exterior surface of the particular tube 66 and a second flange 72 which is disposed normal to the flange 70. Each tube 66 is provided with a plurality of longitudinally spaced discharge openings 74. The lowest wall or edge of the discharge openings 74, as viewed in Figure 1, become progressively lower from right to left.

In order that the individual sections 64 may be coupled together in such a manner whereby the lowest wall or edge of the discharge openings 74 are disposed in a continuous downwardly sloping line, each of the flanges 72 at one end of each of the delivery tube sections 64 is provided with arcuate slots 76 at the top and bottom thereof. Carried by an adjacent flange 72 of an adjacent delivery tube section 64 is a fastener 78 which is best shown in Figure 6 and which passes through its respective slots 76 to permit relative rotation between the delivery tube sections 64.

In order that the flow from the delivery tube 28 may be even throughout the length thereof, there is mounted on an endmost one of the delivery tube sections 54 a lever 80. The lever 80 is provided with a latch mechanism 82 controlled by an operator 84, the latch mechanism 82 cooperating with a keeper 86 carried by the tubular portion 44 of the hopper 30. By utilizing the lever 80 while the conveyor 10 is being operated, the delivery tube 28 may be rotated about its axis so as to properly adjust and position the discharge openings 74 for even flow therethrough. At this time, it is pointed out that the rollers 26 engage the flanges 72, as is best shown in Figure 5, to facilitate the rotation of the delivery tube 28 relative to the supporting frame, the opposed ends of the delivery tube 28 and the tubular extension 44 are provided with abutting flanges which are retained in the position shown in Figure 3 by a pair of the rollers 26 and the latch mechanism 82 and the keeper 86.

In order to control the flow of materials from the hopper 30, there is mounted on the end wall 40 an adjustable baffle plate 88. The baffle plate 88 is held in place on the end wall 40 by means of fasteners 90 and includes an arcuate lower portion 92 which may be adjusted relative to the auger 46.

As is best shown in Figure 1, the frame units 12 and 34 are mounted on a feed bunk which is referred to in general by the reference numeral 94. While the feed bunk 94 is illustrated as being of an elevated type, it is to be understood that it may be in the form of a special concrete slab. The feed bunk 94 includes a bottom wall 96 to which there is secured the individual bases 14 of the frame units 12 by means of suitable fasteners 98.

In order to direct material flowing through the discharge openings 74 down into the feed bunk 94, in the event there is a strong wind blowing or the like, there is mounted below each of the delivery tube sections 64 a deflector 100. The individual deflectors 100 are supported at their upper corners by means of straps 102 carried by pins 104 which are in turn carried by straps 106 extending down from the bars 24.

Figure 7:
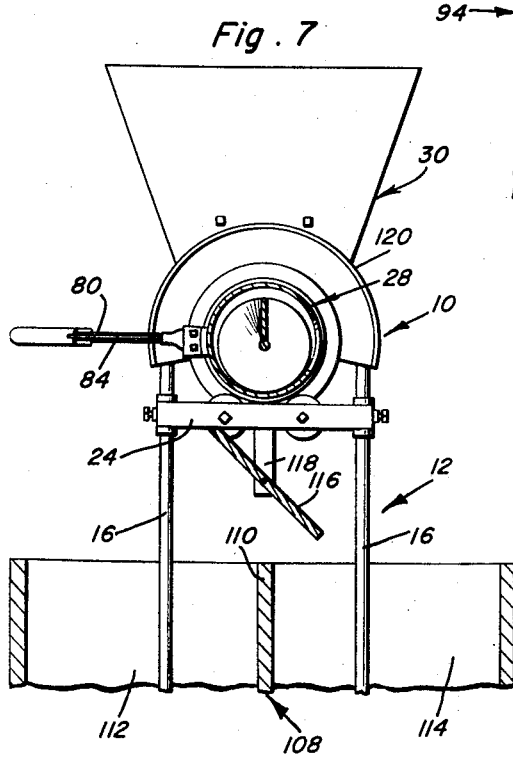
Figure 7 is an enlarged fragmentary sectional view showing the delivery tube in a rotated position and the conveyor mounted above a divided type of feed bunk, there also being illustrated a modified form of deflector plate.

Referring now to Figure 7 in particular, it will be seen that the conveyor 10 is mounted with respect to a modified form of feed bunk, which is referred to in general by reference numeral 108. The feed bunk 108 is provided with a longitudinal divider 110 which divides it into two separate compartments 112 and 114. Also, the deflector plate 100 has been replaced by a deflector plate 116 which is centrally mounted and which hangs from elongated straps 118 carried by the bars 24. Inasmuch as the deflector plate 116 is centrally mounted, it is automatically pivoted by the striking of material thereon. The deflector plate 116 is primarily for the purpose of selectively distributing materials into the two feed bunk sections 112 and 114 as compared to the wind deflecting properties of the deflector plates 100. Also, the delivery tube 28 is illustrated as being mounted for rotation through a much greater angle and the hopper 30 is provided with a keeper 120 of a much greater arcuate extent.

The conveyor 10 may selectively have one hopper or two hoppers. When only one hopper is used, material is progressively discharged through the discharge openings 74 and the excess material is delivered out through an open end of the delivery tube 28. By regulating the position of the baffle 88 and rotating the delivery tube 28, the amount of material such as forage delivered out through the open end of the delivery tube 28 may be that desired. On the other hand, a preferred installation of the conveyor 10 utilizes two hoppers, there being one hopper at each end of the delivery tube 28. By utilizing two hoppers and extending the delivery tube 28 between two buildings, it will be seen that two separate supplies may be distributed by one conveyor, thus providing a great saving. When it is desired to utilize the supply of the hopper 32, the direction of rotation of the auger 46 must be reversed. Also, when the direction of rotation of the auger 46 is reversed, it is necessary that the position of the openings 74 be reversed from one side of the delivery tube 28 to the opposite side. This will make the centers of the discharge openings 74 be disposed along a line which slopes from left to right. Thus, the proper delivery of materials through the discharge openings 74 will still be facilitated even though the direction of rotation of the auger 46 and movement of the materials through the delivery tube 28 is reversed. Incidentally, if it is so desired, the individual delivery tube sections 64 may be provided with levers, such as the lever 80, to facilitate individual adjustment thereof.

From the foregoing description of the conveyor 10, many advantages thereof will readily become apparent. For one thing, inasmuch as the delivery tube 28 is formed in a plurality of individual sections, it will be seen that the length of the conveyor 10 may be varied as desired. If it is so desired, the auger 46 may also be formed in sections which correspond in length to the delivery tube sections 64. Also, the conveyor 10 is of such a nature whereby the flow may be properly distributed but may be properly controlled so that the materials delivered thereby may be distributed as desired throughout the length of the feed bunk. Further, weather has no adverse effect on the operation of the conveyor 10 inasmuch as the individual components thereof are sealed against the weather.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A conveyor for forage and like materials, said conveyor comprising frame means, a fixed hopper mounted on said frame means, an elongated delivery tube mounted on said frame means for rotation about its longitudinal axis, means connecting said delivery tube to said hopper, an auger disposed within said delivery tube and extending into said hopper, said delivery tube having longitudinally spaced discharge openings therein, and rotation adjustment control means operatively associated with said delivery tube for positioning same about its axis for controlling the flow of material through said discharge openings therein, the lowest walls of said discharge openings being disposed progressively lower from a high point adjacent said hopper away from said hopper to a low point remote from said hopper whereby a preadjusted even discharge of material along the length of said delivery tube is facilitated.

2. A conveyor for forage and like materials, said conveyor comprising frame means, a fixed hopper mounted on said frame means, an elongated delivery tube mounted on said frame means for rotation about its longitudinal axis, means connecting said delivery tube to said hopper, an auger disposed within said delivery tube and extending into said hopper, said delivery tube having longitudinally spaced discharge openings therein, rotation adjustment control means operatively associated with said delivery tube for positioning same about its axis for controlling the flow of material through said discharge openings therein, the lowest walls of said discharge openings being disposed progressively lower from a high point adjacent said hopper and away from said hopper to a low point remote from said hopper whereby a preadjusted even discharge of material along the length of said delivery tube is facilitated, and said frame means including roller supports for said delivery tube to facilitate rotation thereof.

3. A conveyor for forage and like materials, said conveyor comprising frame means, a fixed hopper mounted at one end on said frame means, an elongated delivery tube mounted on said frame means for rotation about its longitudinal axis, means connecting said delivery tube to said hopper, an auger disposed within said delivery tube and extending into said hopper, said delivery tube having longitudinally spaced discharge openings therein, rotation adjustment control means operatively associated with said delivery tube for positioning same about its axis for controlling the flow of material through said discharge openings therein, the lowest walls of said discharge openings being disposed progressively lower away from said hopper whereby a preadjusted even discharge of material along the length of said delivery tube is facilitated, a second hopper at the opposite end of said delivery tube, and drive means for said auger mounted on one of said hoppers, said drive means being of the reversible type whereby materials may be taken from either hopper.

4. A conveyor for forage and like materials, said conveyor comprising frame means, a fixed hopper mounted at one end on said frame means, an elongated delivery tube mounted on said frame means for rotation about its longitudinal axis, means connecting said delivery tube to said hopper, an auger disposed within said delivery tube and extending into said hopper, said delivery tube having longitudinally spaced discharge openings therein, rotation adjustment control means operatively associated with said delivery tube for positioning same about its axis for controlling the flow of material through said discharge openings therein, the lowest walls of said discharge openings being disposed progressively lower away from said hopper whereby a preadjusted even discharge of material along the length of said delivery tube is facilitated, a second hopper at the opposite end of said delivery tube, drive means for said auger mounted on one of said hoppers, said drive means being of the reversible type whereby material may be taken from either hopper, and said control means being of the type which facilitates the rotation adjustment of said delivery tube to shift said discharge openings from one side of said frame to the other.

5. A conveyor for forage and like materials, said conveyor comprising frame means, a fixed hopper mounted at one end on said frame means, an elongated delivery tube mounted on said frame means for rotation about its longitudinal axis, means connecting said delivery tube to said hopper, an auger disposed within said delivery tube and extending into said hopper, said delivery tube having longitudinally spaced discharge openings therein, rotation adjustment control means operatively associated with said delivery tube for positioning same about its axis for controlling the flow of material through said discharge openings therein, the lowest walls of said discharge openings being disposed progressively lower from a high point adjacent said hopper away from said hopper to a low point remote from said hopper whereby a preadjusted even discharge of material along the length of said delivery tube is facilitated, said delivery tube being formed of a plurality of similar sections, and adjustable fastening means connecting said tube sections together.

6. A conveyor for forage and like materials, said conveyor comprising frame means, a fixed hopper mounted at one end on said frame means, an elongated delivery tube mounted on said frame means for rotation about its longitudinal axis, means connecting said delivery tube to said hopper, an auger disposed within said delivery tube and extending into said hopper, said delivery tube having longitudinally spaced discharge openings therein, rotation adjustment control means operatively associated with said delivery tube for positioning same about its axis for controlling the flow of material through said discharge openings therein, the lowest walls of said discharge openings being disposed progressively lower from a high point adjacent said hopper away from said hopper to a low point remote from said hopper whereby a preadjusted even discharge along the length of said delivery tube is facilitated, means on said frame means for mounting said delivery tube above a feed bunk, said feed bunk having sections disposed on opposite sides of the longitudinal center of said delivery tube, and a deflector for the forage mounted beneath said delivery tube for selectively diverting forage to said feed bunk sections.

References Cited in the file of this patent
UNITED STATES PATENTS

| | | |
|---|---|---|
| 2,350,476 | Richey | June 6, 1944 |
| 2,511,514 | Rosselot | June 13, 1950 |
| 2,545,140 | Escher | Mar. 13, 1951 |
| 2,630,906 | Philipp | Mar. 10, 1953 |
| 2,793,615 | Kerkvliet | May 28, 1957 |